Sept. 9, 1941.                C. E. PINK                2,255,364
                           CONVEYER BELT
                        Filed Aug. 7, 1939           2 Sheets-Sheet 1
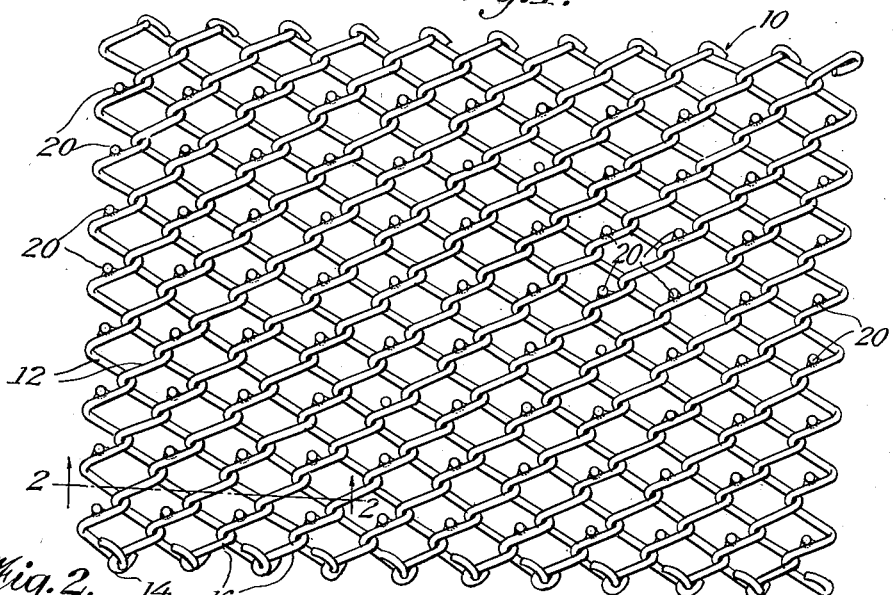
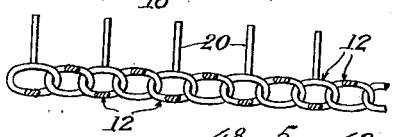
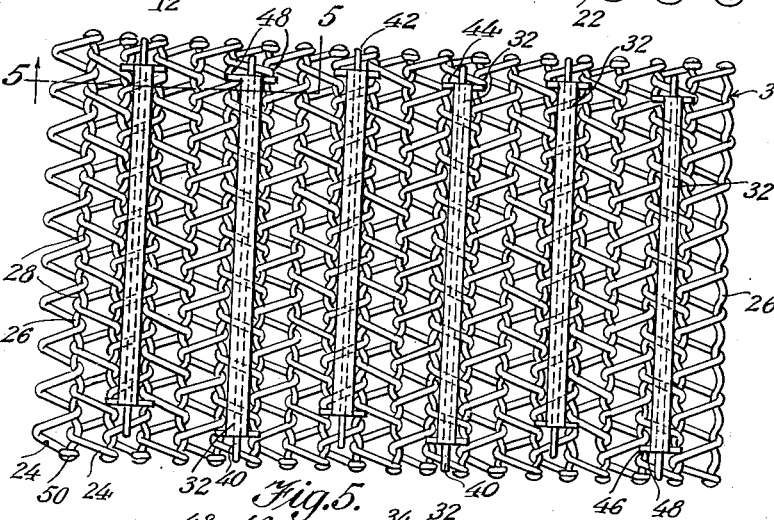
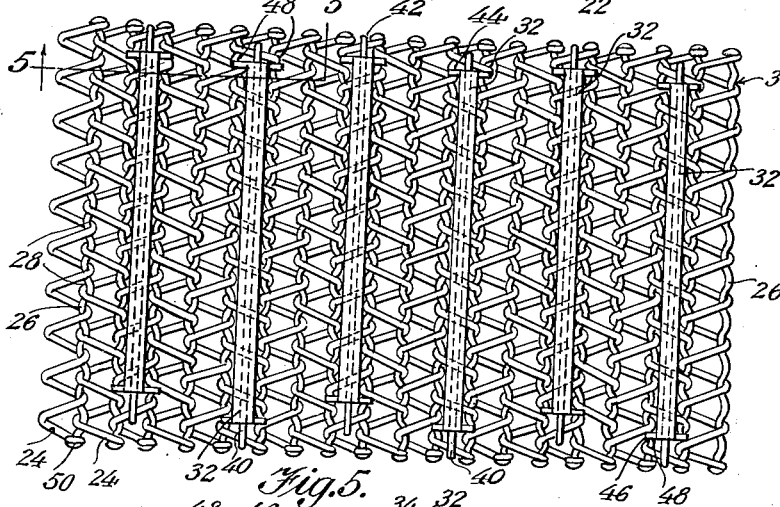
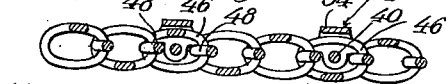
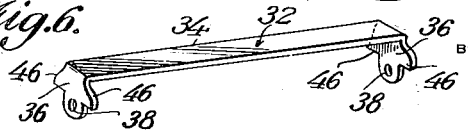
Clarence E. Pink
INVENTOR
BY Victor J. Evans & Co.
ATTORNEYS Sept. 9, 1941.    C. E. PINK    2,255,364
CONVEYER BELT
Filed Aug. 7, 1939    2 Sheets-Sheet 2
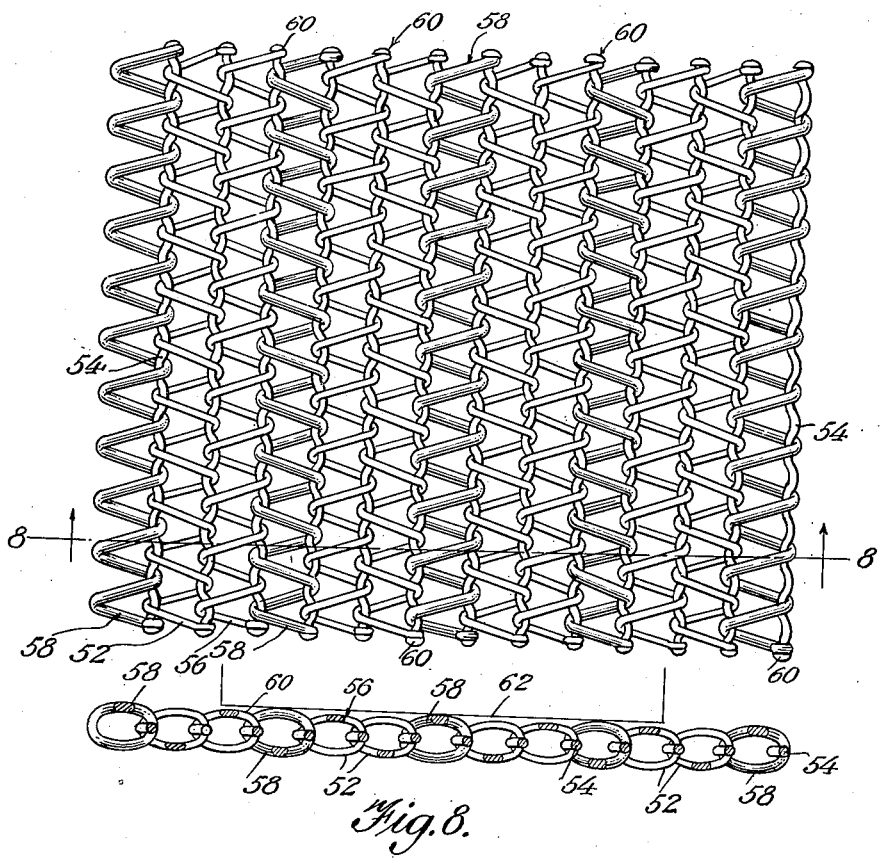
Clarence E. Pink
INVENTOR
BY Victor J. Evans & Co.
ATTORNEYS Patented Sept. 9, 1941

2,255,364

UNITED STATES PATENT OFFICE 2,255,364

CONVEYER BELT

Clarence E. Pink, Cambridge, Md.

Application August 7, 1939, Serial No. 288,864

2 Claims. (Cl. 198—193)

In conveyer systems employed for heat treating material and articles carried on the conveyer it is necessary to employ metallic belts because of the high temperatures to which the belt is subjected. Belts of the mesh type provide efficient conveyers but in handling material such as aluminum sheets, for example, the sheets contacting the wires of the belt may become marked by such contact.

Accordingly, an object of my invention is to provide novel means in a conveyer of the type described so designed as to prevent the articles from contacting the wires of the belt to prevent product marking.

In the accompanying drawings:

Figure 1 is a fragmentary plan view of a mesh belt in accordance with my invention;

Figure 2 is a sectional view along the line 2—2 of Figure 1;

Figure 3 is a side elevational view of one of the helical wires of the belt illustrating the article supporting pins associated therewith;

Figure 4 is a fragmentary plan view of a different form of construction;

Figure 5 is a sectional view along the line 5—5 of Figure 4;

Figure 6 is a perspective view of one of the article supporting bars;

Figure 7 is a fragmentary plan view of another form of my invention; and

Figure 8 is a sectional view along the line 8—8 of Figure 7.

In the embodiment selected to illustrate my invention, I make use of a mesh belt 10 made up of laced wire runs 12 extending transversely of the belt. Wire runs 12 are wound helically and the convolutions flattened slightly, so that the convolutions take the shape of ovals when viewed according to Figure 2. The ends of the runs 12 are looped and interconnected as at 14, while the convolutions of each run are threaded through the convolutions of two adjacent runs as at 16.

To the upper reach 18 of each convolution of alternate runs 12 I secure upright article supporting pins 20. Pins 20 are welded or brazed at 22 to their respective reaches 18 and the upper ends of the pins lie in a common plane in the straight phase of the belt, so as to provide a uniformly level support for the product or articles, which support constitutes a plurality of small diameter and closely spaced flat areas positioned above the upper plane of the belt for supporting the load in spaced relation therewith. Obviously, the pins 20 may be connected with the reaches 18 of all the runs 12, but good results have been attained with the pin arrangement of Figures 1, 2 and 3. In the straight phase of the belt, the pins 20 take true vertical positions, and the pins are so located as not to impair the flexibility of the belt when passing around drums through the medium of which the belt is supported. The belt runs between the drums may be supported by any suitable platform (not shown).

In heat treating certain types of articles, it is necessary to employ a metallic belt in addition to providing article supporting means devoid of scaling and surface oxidation characteristics. Such material as copper article supporting elements embodies suitable noncorrosive properties. In heat treating systems, the conveyer belt may comprise plain steel which embodies a desirable element of heat resistance and tensile strength, but scaling and surface oxidation of such material tend to cause marking of the products carried thereon.

I have found that such a belt provided with copper supporting bars, or equivalent material, provides a carrying surface which eliminates product marking, in addition to permitting the use of material in the belt proper of the necessary tensile strength when subjected to elevated temperatures. Figures 4, 5 and 6 illustrate such a belt in which the wire runs 24 are of the same general configuration as the runs 12, but are interconnected through the medium of wires 26. One wire 26 is threaded through the convolutions of two runs 24, and the wires are bent in zigzag fashion so as to provide oppositely arranged depressions 28 within which the convolutions of the runs 24 lie to be restrained from relative longitudinal movement.

Transversely of the belt 30 of Figure 4 I arrange a plurality of product or article carrying bars or cleats 32. Bars 32 may comprise copper straps having flat faces 34 and ears 36 at their ends, as illustrated in Figure 6. In the latter figure, the ears 36 are provided with openings 38 for the reception of a wire 40. Figures 4 and 5 illustrate the bars 32 as being associated with every third run 24, but the spacing may be varied to suit the demands of a particular installation.

Referring to Figure 5, the wires 40 lie inside the convolutions of their respective runs 24, and the ends of the wires are looped at 42 about the upper reaches 44 of the end convolutions of their respective runs 24. Lugs 46 on the ears 36 are arranged to extend across two wires 26, as illustrated at 48 in Figures 4 and 5. Thus the ears 36 are loosely connected with the wires 40 but the bars 32 are balanced in a common horizontal plane in the straight reaches of the belt 30.

While the lugs 46 cooperate with the associated wires 26 for balancing the bars 32 in the manner of Figures 4 and 5, the lugs 46 are so related to their respective wires 26 as to permit the belt 30 to flex easily about its associated drums. The flat faces 34 lie in a common plane spaced from the plane of the upper face of the belt 30 so as to hold the articles or material entirely in the clear of the belt. The two ends of each wire 26 are welded at 50 to the ends of one of the helical runs 24, so that all the parts of the belt are interconnected into a unitary, flexible structure.

Figures 7 and 8 illustrate another form of invention in which I make use of helical wire runs 52 interconnected by wires 54, the runs and the wires being of the same construction as the runs 24 and the wires 26, respectively, of Figures 4 and 5. Runs 52 are grouped in sections 56, preferably comprising two helical wires 52, which sections are interconnected by helical wire runs 58, preferably of bronze material. Thus one helical wire 58 interconnects two sections 56, with the convolutions of the runs 58 connected with the associated wires 54 in the same manner as the runs 52. The ends of the runs 58 are welded or brazed to their associated cross wires 54, as at 60, in the same manner as the runs 52.

While the runs 58 embody the same number of convolutions as the runs 52, the runs 58 are fashioned from larger diameter wire with the convolutions larger but flattened to an oval shape when viewed according to Figure 8 in the same manner as the convolutions of Figures 1 to 5. Referring to Figure 8, the upper reaches 60 of the convolutions of the runs 58 lie in a common plane as illustrated by the line 62, which plane is spaced above the plane of the upper face of the belt. Thus the runs 58 serve a twofold function, in that they constitute portions of the belt as a whole in addition to serving as load bearing means for supporting the articles or product in spaced relation with the belt proper, so as to prevent product marking.

Referring to Fig. 7, it will be noted that the larger runs 58 are so arranged that they alternate right and left for load supporting purposes so as to eliminate creeping.

In the structure of Figures 7 and 8, the wire runs 58 comprise wire of considerably heavier gauge than the wire of the runs 52, so as to embody the necessary tensile strength. Thus, this form of the invention embodies a belt in which certain of the convoluted wire runs are fashioned in accordance with the wire runs of the belt proper, in addition to embodying non-product marking properties.

All the belts are of open mesh construction so as to provide low thermal capacity and even circulation of heat, in addition to being so constructed as to effectively prevent product marking of the material or articles carried by the belts for heat treating purposes.

Having thus described certain embodiments of my invention in detail, it is, of course, understood that I do not desire to limit the scope thereof to the exact details set forth except in so far as those details may be defined in the appended claims.

I claim:

1. In a conveyer of the type described, a belt comprising interlaced helical wires, and product supporting pins attached to some of the convolutions of the helical wires, said pins extending upwardly from the belt in such degree as to hold the product spaced from the belt, to prevent belt marking of the product, said pins having a total cross sectional area of relatively small proportions with respect to total belt area.

2. In a conveyer of the type described, a belt comprising interlaced helical wires, and product supporting pins extending upwardly from the belt, said product supporting pins being welded to some of the convolutions of some of said helical wires, said pins having a total cross-sectional area of relatively small proportion with respect to total belt area.

CLARENCE E. PINK.